June 23, 1959     D. PAPAGEORGES     2,891,410
SPEED VARYING DEVICE
Filed Oct. 1, 1956
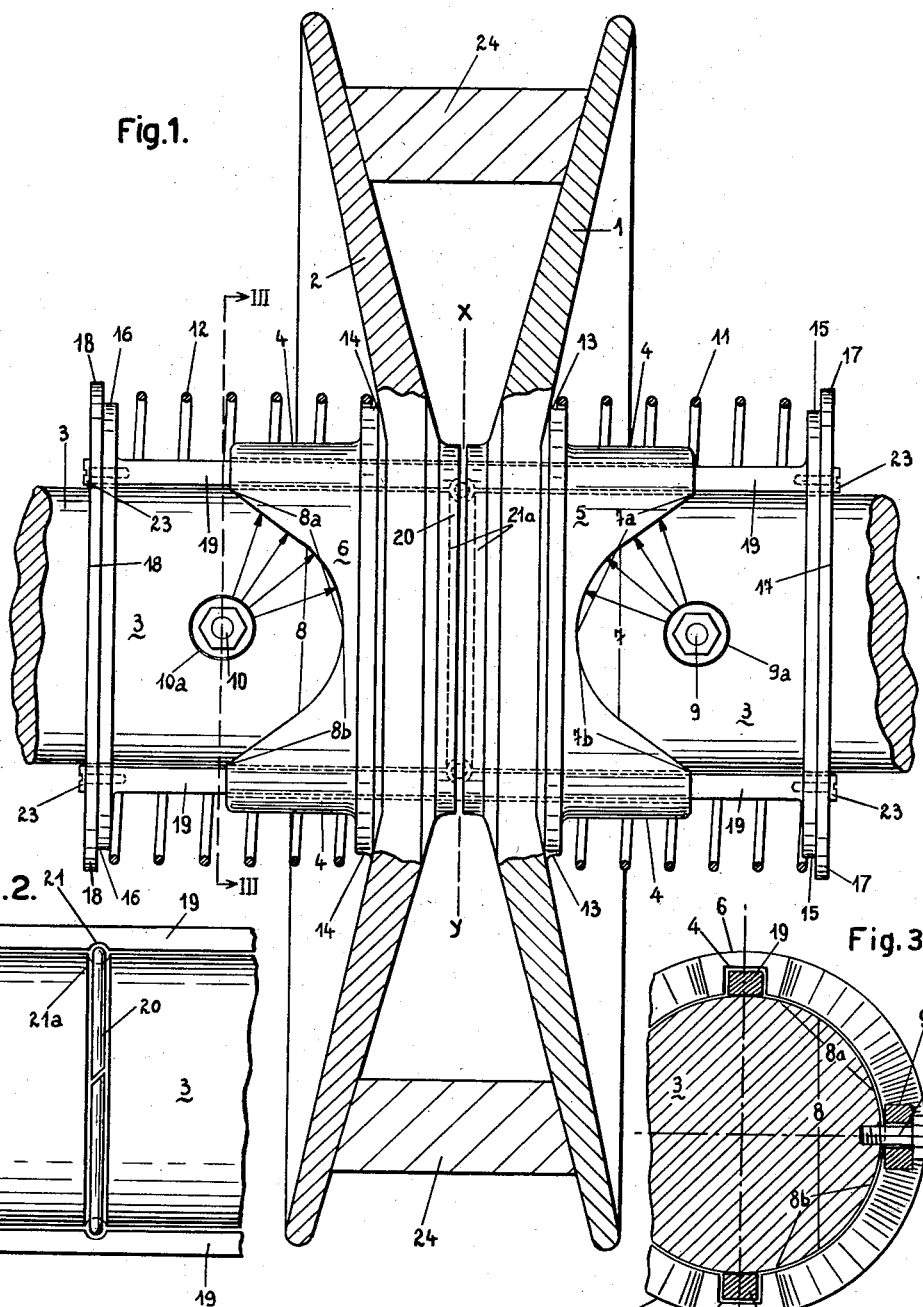
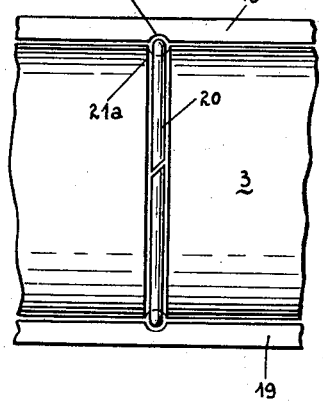
INVENTOR
Demètre PAPAGEORGES
BY *Robbie & Bastien*
ATTORNEYS

United States Patent Office 2,891,410
Patented June 23, 1959

2,891,410

SPEED VARYING DEVICE

Demetre Papageorges, Liege, Belgium

Application October 1, 1956, Serial No. 613,070

2 Claims. (Cl. 74—230.17)

This invention relates to a speed varying device between two shafts (driving shaft or driven shaft, or inversely), of the kind comprising a pulley constituted by two conical discs between which a trapezoidal-sectioned driving belt can be displaced in rotary and radial directions according to the driving and resistance torque, and is characterised by the fact that the hubs of the two conical pulley discs are provided each with a bore in which the driving or driven shaft can turn, and are adapted to be displaced laterally one in relation to the other but without relative rotation, by the intervention of mutual coupling means, and are rotatably driven collectively by driving members disposed symmetrically or not with respect to the plane of symmetry of the two conical discs, said driving members being mounted on the driving or driven shaft and being adapted to make contact, according to the torque to be transmitted, at points on the radial faces, which are of sinusoidal form, of recesses or notches formed in the thickness of the walls of the hubs of the two conical discs, whilst the longitudinal displacements of the two conical discs relatively to one another are controlled by light coiled compression springs surrounding each hub and contacting by their ends on the respective hubs and on annular plates rigid with the coupling means for the two conical discs.

Thus, as a result of the construction above referred to, the two conical discs must necessarily separate simultaneously from the fact that the driving members, mounted on the shaft and on the hubs of the conical discs, must be applied on the radial flanks or surfaces either of recesses or notches made in the thickness of the hubs of the conical discs. There can thus be no disalignment of the belt. The initial force which presses the two discs against the belt when it is not transmitting torque is very small and prevents compression of the belt on its flanks. At every position of the conical discs (therefore at all speeds) the lateral pressure of the discs on the flanks of the belt are proportional to the value of the torque being transmitted which creates an adherence such as to prevent slipping and such that the belt is not worn on its flanks, whatever may be the torque. By reason of the fact that a pressure proportional to the torque transmitted is automatically established, the discs tend to approach one another. They give at first a better adherence, and tend to increase the speed, which compensates for slipping of the belt in the pulley groove due to the increase in the power to be transmitted. The belt thus sets itself automatically and prevents slackness which can cause whip.

It is obvious that the driving shaft and the driven shaft may each be provided with a speed varying device comprising a pulley constructed as above described.

In order to make clear the above description, the accompanying diagrammatic drawings show, by way of example only, several embodiments of the invention, and in these drawings:

Figure 1 is an elevational view of a speed varying device with the cheeks of the conical discs forming the pulley shown partially in section.

Figure 2 is a view in elevation of a part of the length of the shaft and of the two longitudinal keys disposed on the periphery of the shaft symmetrically opposed in relation to the longitudinal axis of the driving or driven shaft.

Fig. 3 is a cross-section on line III—III of Fig. 1.

Referring to Figure 1, the pulley is constituted by two conical discs 1 and 2 provided respectively with hubs 5, 6, in the bores of which the driving or driven shaft 3 can turn.

In the example, the shaft 3 is supposed to be the end of the shaft of a motor or a transmission shaft, but it can be constituted by a simple sleeve keyed or fixed, by usual means, on the driving or driven shaft proper. The speed-varying device then constitutes a self-contained unit equivalent to an ordinary pulley, being capable of being mounted on or dismounted from the shaft like an ordinary pulley. The hubs 5 and 6 are each provided along their bores with two grooves 4 diametrically opposed, those of one hub being arranged in alignment with those of the other hub, in a manner which enables them to be engaged by keys 19 provided for this purpose and not having any contact with the driving or driven shaft 3.

In the plane of symmetry indicated by X—Y, Figure 2, the two keys 19 are each provided with a notch 21 in which is engaged the circumferential outer periphery of an elastic split ring 20, of circular form, constituted by a curved steel wire of which the interior circumferential periphery is located in a circular groove 21a formed in the outer periphery of the driving or driven shaft 3, in the said plane X—Y.

Thus, this ring 20 prevents longitudinal displacements of the keys 19 with respect to the plane X—Y. On the ends of the keys 19 are fixed, by means of screws 23, annular discs 17 and 18 independent of the shaft 3.

Very light coiled compression springs, such as 11 and 12, are engaged, on opposite sides of the symmetrical plane X—Y, between the conical discs 1 and 2 on the one hand, and on the other hand, annular discs 17 and 18 carried by the ends of the keys 19. These springs 11 and 12 are supported, by their ends which are directed towards the plane X—Y, respectively upon shoulders 13 of the hub 5 of disc 1 and upon shoulders 14 of the hub 6 of disc 2, and, by their opposite ends, upon shoulders 15, 16, respectively of the annular discs 17, 18.

On the shaft 3 are fixed, in a radial direction, the driving means constituted, in the example illustrated, by pins 9, 10, respectively, on which rollers 9a, 10a, respectively can turn, which rollers, when the shaft 3 turns, make contact on the concave, sinusoidal surfaces of recesses or notches 7, 8, respectively, in the directions indicated by the arrows at points of contact varying according to the value of the driving torque in relation to the resistance torque, which arrangement automatically causes the relative approach or separation of the conical discs 1 and 2 by sliding on the keys 19. Thus the belt 24 occupies, between the said conical discs 1 and 2, a corresponding position where the lateral forces of the discs on the flanks of the belt 24 are proportional to the value of the torque to be transmitted or received, which ensures an adherence of the belt without slipping.

The respective parts 7a, 8a, of the recesses 7, 8 are utilised, by the respective driving members 9, 10, for one direction of rotation, whilst the parts 7b, 8b, are utilised for a reverse direction of rotation of shaft 3.

The respective driving members 9, 10, can be of any number, corresponding to the number of recesses 7, 8, and can be of any suitable form, even in cam form fixed or rotatably adjustable.

The functioning will be easily understood from the above description, it being understood that the position of the belt between the conical discs is automatically controlled in consequence of the manner in which it is subjected to the prevailing torque that is transmitted or received, thus ensuring an efficient operation without undue wear, especially of the trapezoidal belt.

It is obvious that several speed-changing devices, as described above, could be disposed in parallel relation side-by-side on the same shaft 3 when large forces are to be transmitted.

What I claim is:

1. In a speed varying device having a driving shaft and a driven shaft, a pulley on one of said shafts, composed of two axially movable conical discs having axial bores engaging and rotatable on said one shaft, a belt of trapezoidal form engageable between said discs and radially displaceable according to the distance between said discs, driving means comprising pins fixed to said one shaft, and sinusoidal, oppositely concave faces engageable by said pins, fixed to said discs, and spring means urging said discs against each other, an assembly comprising two diametrically opposite keys disposed adjacent said one shaft, said keys engaged in notches in the axial bores of said discs, and two rings fixed to the ends of said keys and surrounding said one shaft, said assembly being rotatable on said one shaft, said spring means comprising two compression springs each engaged between a ring and the corresponding disc, whereby said pulley is rotatable on said one shaft, while said two discs are angularly fixed with respect to each other.

2. Speed varying device as claimed in claim 1, further comprising an inner notch in each said key, an annular groove in said shaft, and an elastic split ring engaging said notches and said annular groove, to thereby prevent axial displacement of said key and ring assembly, and to allow removal of said key and ring assembly from said shaft.

References Cited in the file of this patent
UNITED STATES PATENTS

| | | |
|---|---|---|
| 2,092,469 | Oslund | Sept. 7, 1937 |
| 2,276,186 | Getchell | Mar. 10, 1942 |
| 2,283,392 | Shadrick | May 19, 1942 |
| 2,694,316 | Hultin | Nov. 16, 1954 |
| 2,699,071 | Miner | Jan. 11, 1955 |

FOREIGN PATENTS

| | | |
|---|---|---|
| 695,248 | Germany | Aug. 21, 1940 |